United States Patent [19]

Pent

[11] Patent Number: 5,042,932

[45] Date of Patent: Aug. 27, 1991

[54] ELECTRICALLY OPERATED REARVIEW MIRROR FOR MOTOR-VEHICLES

[75] Inventor: Ercole Pent, Villarfocchiardo, Italy

[73] Assignee: P. M. P. S. a. s. di Peano C. & C., Turin, Italy

[21] Appl. No.: 552,036

[22] Filed: Jul. 13, 1990

[30] Foreign Application Priority Data

Jul. 14, 1989 [IT] Italy ............................... 53252/89[U]

[51] Int. Cl.⁵ ................................................ G02B 7/18
[52] U.S. Cl. ..................................... 359/874; 359/877
[58] Field of Search ................. 350/633, 634, 636, 637

[56] References Cited

U.S. PATENT DOCUMENTS 4,482,211 11/1984 Fisher ................................... 350/637
4,696,555 9/1987 Enomoto ............................. 350/637
4,815,837 3/1989 Kikuchi et al. ...................... 350/637

Primary Examiner—Bruce Y. Arnold
Assistant Examiner—J. P. Ryan
Attorney, Agent, or Firm—Sughrue, Mion, Zinn, Macpeak & Seas

[57] ABSTRACT

A rearview mirror for motor vehicles includes a support body of dish-like configuration in which adjusting devices for adjusting the position of the mirror are mounted. The support body includes a casing with seats for supporting electrical drive members and transmission mechanisms which engage the mirror to pivot the mirror about at least two perpendicular axes. The casing and the seats for the drive members and transmission mechanisms are formed of integral one piece constuction with the support body.

2 Claims, 2 Drawing Sheets

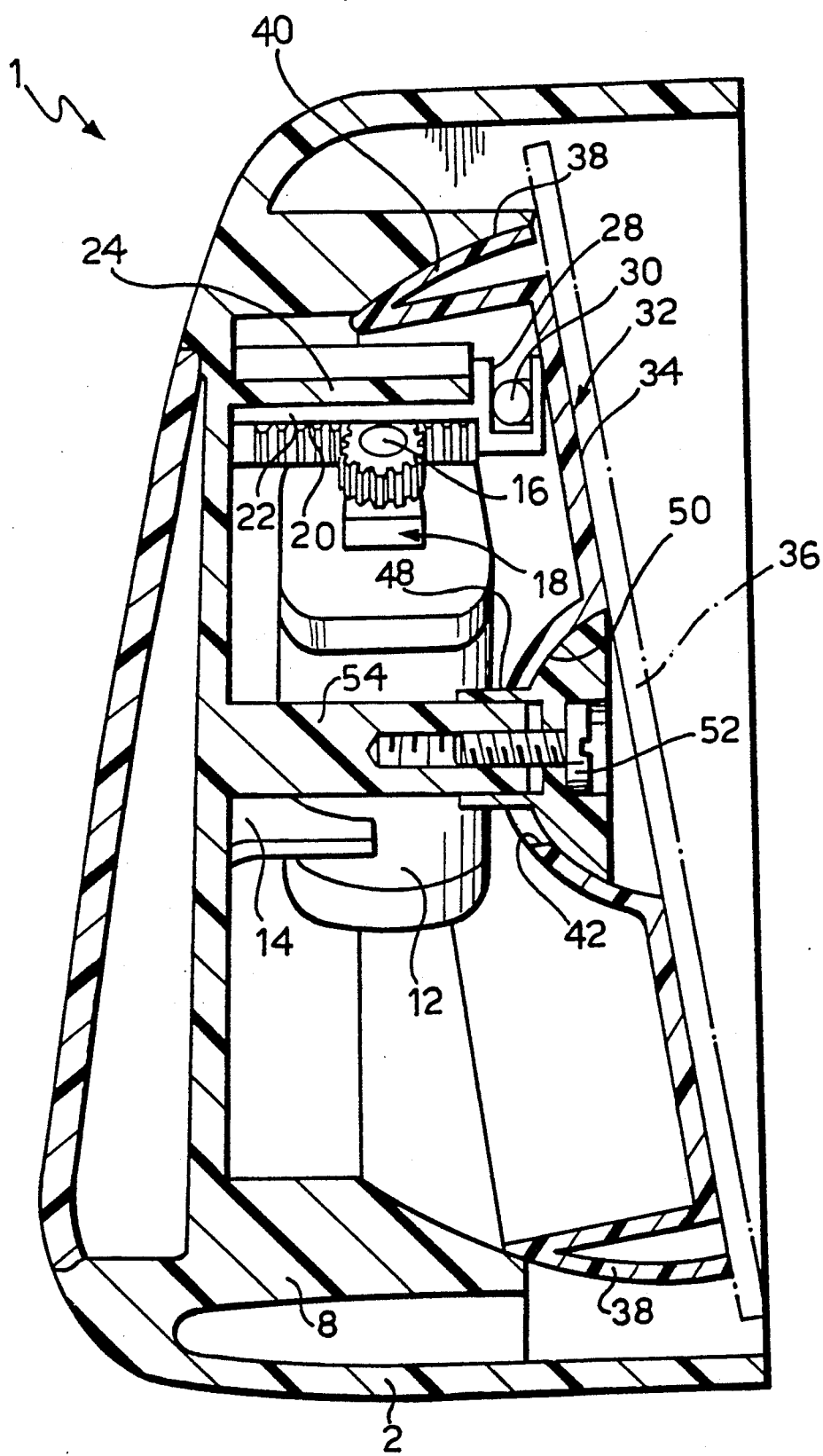

ELECTRICALLY OPERATED REARVIEW MIRROR FOR MOTOR-VEHICLES

BACKGROUND OF THE INVENTION

The present invention relates to a rearview mirror for motor vehicles, of the type in which the position of the mirror can be adjusted electrically from inside the vehicle.

More specifically, the invention relates to a rearview mirror for motor vehicles, including a support body of dish-like configuration in which a device for adjusting the position of the mirror is intended to be arranged, the device including a housing with seats for electrical drive means and for transmission means which are adapted to cause the mirror to pivot about at least two perpendicular axes.

In known rearview mirrors, the adjustment device constitutes an independent unit and is normally fixed to a metal support flange which serves to attach the mirror to the vehicle.

SUMMARY OF THE INVENTION

The object of the present invention is to provide a rearview mirror of the type defined above, having a structure which is simpler and cheaper to produce than that of known mirrors.

According to the present invention, this object is achieved by a mirror of the type defined above, in which the housing and the seats for the drive and transmission means are formed integrally with the support body.

BRIEF DESCRIPTION OF THE DRAWINGS

Further characteristics and advantages of the present invention will become clear in the course of the detailed description which follows with reference to the appended drawings, provided purely by way of non-limiting example, in which:

FIG. 2 is a section taken on the line II—II of FIG. 1.

DETAILED DESCRIPTION OF THE INVENTION

Figure 1:
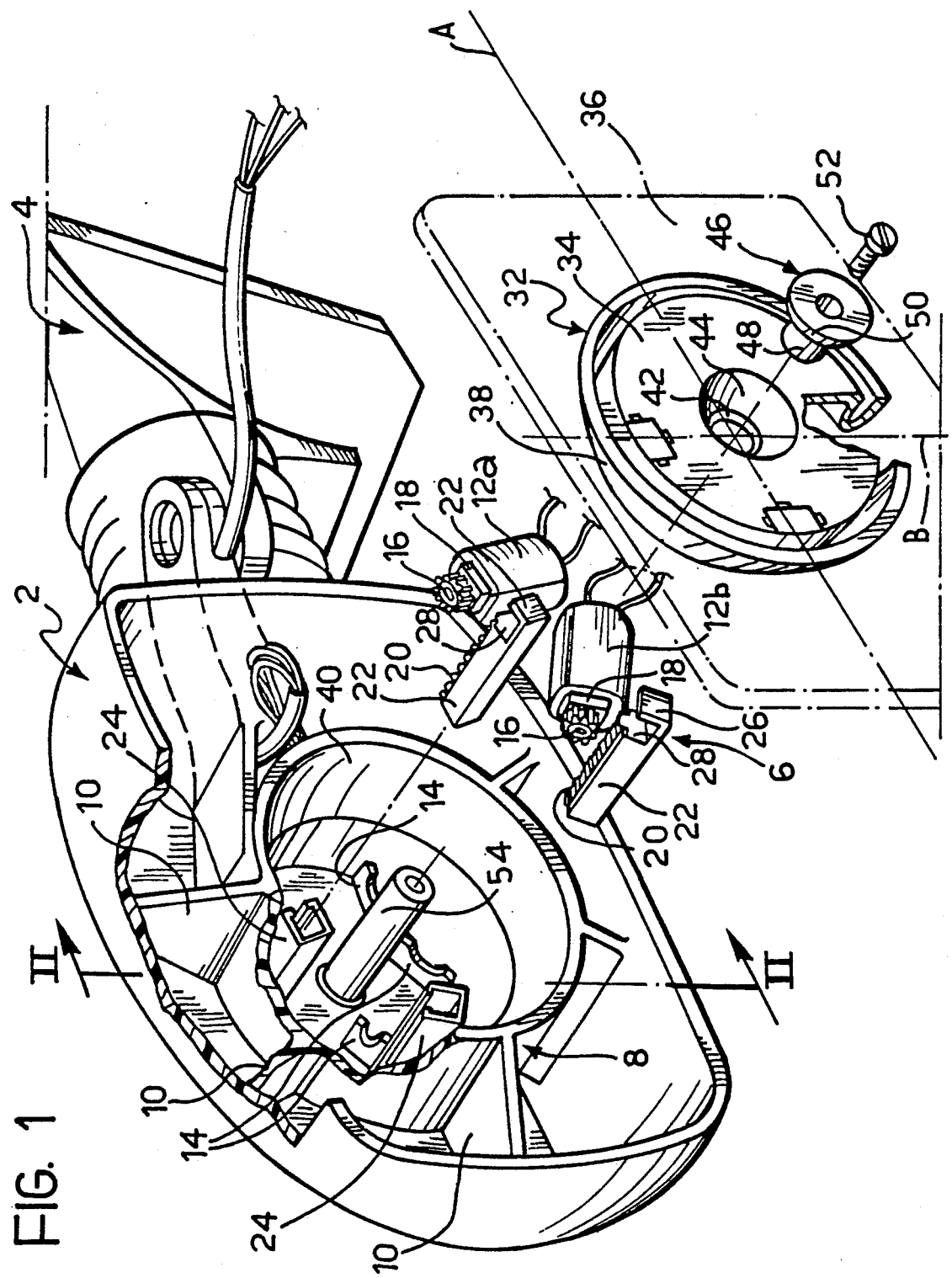
FIG. 1 is an exploded perspective view of a rearview mirror according to the present invention.

With reference to the drawings, an external rearview mirror for motor vehicles, indicated 1, includes a support body 2 of dish-like configuration which is articulated to a flange 4 for fixing to the motor-vehicle body (not shown).

A device, generally indicated 6, for adjusting the mirror is disposed within the support body 2. According to conventional techniques, the device 6 constitutes an independent unit which is fixed to the support body 2 by means of a flange and screws.

According to the present invention, the support body 2 has an internal cylindrical wall 8 which is moulded integrally with the body 2 and constitutes the housing for the adjustment device 6. Stiffening flanges 10 connect the wall 8 to the base of the support body 5.

The adjustment device 6 comprises a pair of electric motors 12a, 12b fixed in respective seats 14 which are formed integrally of one piece construction with the support body 2. The shaft of each electric motor 12a, 12b is connected to a pinion 16 with the interposition of an epicyclic reduction gear 18. The pinions 16 mesh with respective racks 20 formed on two operating arms 22 which are mounted for sliding in guides 24 integrally which are formed of one piece construction with the support body 2. Respective recesses 28 are formed at the ends 26 of the operating arms 22 and are engaged by respective spherical heads 30 carried by a pivoting element 32 (see FIG. 2). The pivoting element 32 has a flat surface 34 to which the mirror 36, shown in broken outline in the drawings, is fixed.

The pivoting element 32 has a spherical external profile 38 and is arranged in a spherical seat 40 formed by the periphery of the wall 8 which constitutes the housing for the adjustment device 6. The central part of the pivoting element 32 has a through-hole 42 which communicates with a spherical seat 44. A fixing element 46 is arranged in the hole 42 and has a cylindrical shank 48 and a head with a spherical portion 50 which engages the spherical seat 44 in the pivoting element 32. The fixing element 46 has an internal bore and is fixed by means of a screw 52 to a pin 54 coaxial with the cylindrical wall 8 and also formed integrally with the support body 2. As can be seen in FIG. 2, the hole 42 has a larger diameter than the cylindrical shank 48 of the fixing element 46 so that the element 32 is free to pivot in the spherical seat 40 as a result of the operation of the electric motors 12a, 12b. When the motor 12a is operated, the operating arm 22 associated therewith causes the element 32 to pivot about the axis indicated A in FIG. 1, whilst the operation of the motor 12b causes the element 32 to pivot about the axis B which is perpendicular to the axis A.

I claim:

1. A rearview mirror for motor vehicles comprising:
   a support body of dish-like configuration in which adjusting means for adjusting the position of the mirror are mounted,
   said adjusting means including a housing having a cylindrical wall which projects from the bottom of the support body, the periphery of the wall forming a spherical seat in which is mounted a pivoting element to which the mirror is fixed, and
   seats for electrical drive means and for transmission means which are connected to the mirror to pivot the mirror about at least two perpendicular axes,
   said housing and said seats for the drive means and transmission means being formed of one piece construction with the support body.

2. A rearview mirror as set forth in claim 1, wherein said pivoting element has a central part with a through-hole which communicates with another spherical seat, said another spherical seat being engaged by a fixing element with a spherical head having a shape corresponding to said another spherical seat, the fixing element being fixed to a pin which extends along a longitudinal axis of the housing and is formed of one piece construction with said support body.

* * * * *